Aug. 4, 1959                L. A. HOWSLEY, JR., ET AL                2,897,631
APPARATUS FOR SOILLESS PLANT CULTIVATION
Filed March 22, 1957                                          2 Sheets-Sheet 1
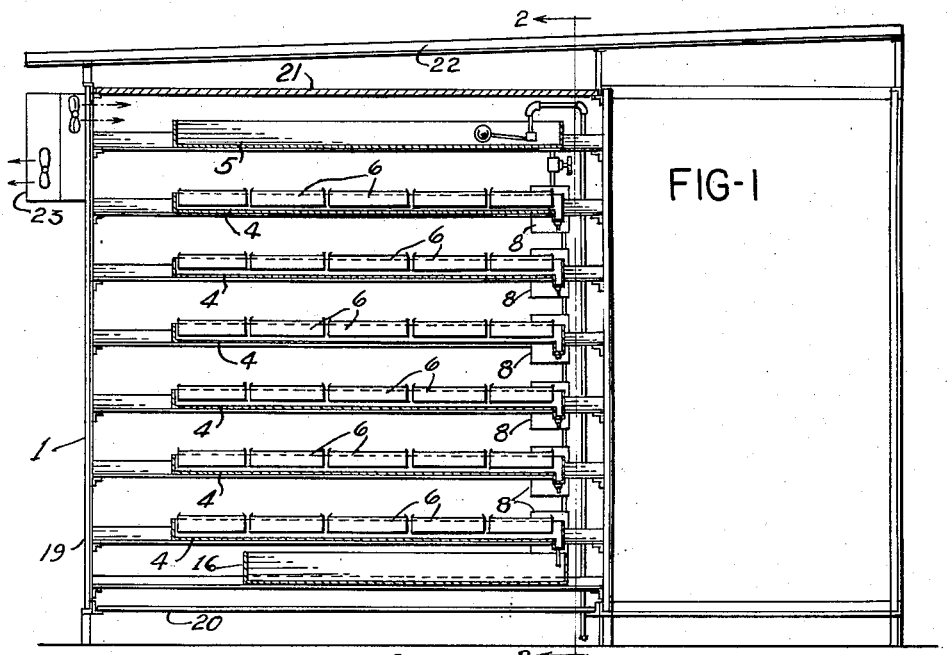
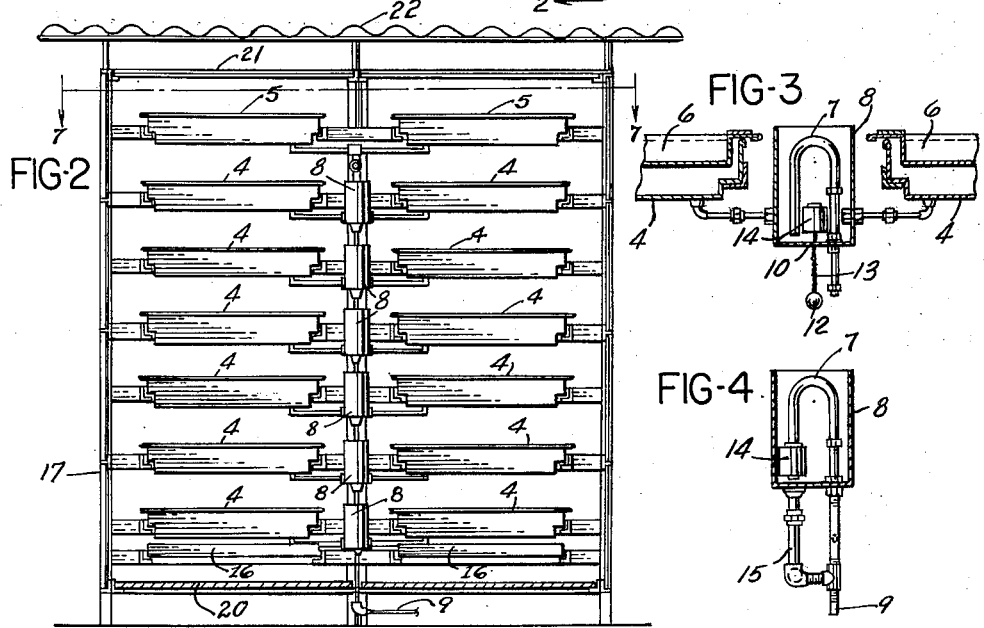
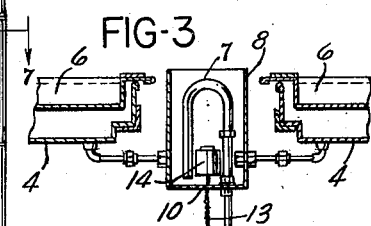
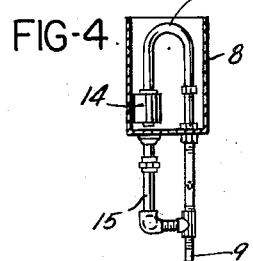
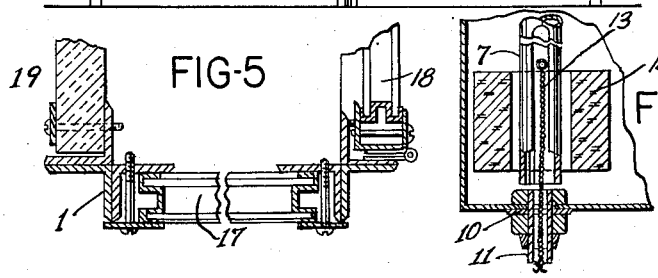
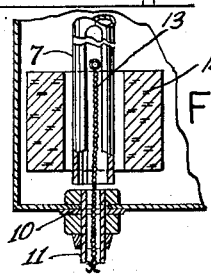
LOUIS A HOWSLEY, JR
ROGER L MALONE
INVENTOR.
BY
ATTORNEY Aug. 4, 1959 L. A. HOWSLEY, JR., ET AL 2,897,631
APPARATUS FOR SOILLESS PLANT CULTIVATION
Filed March 22, 1957 2 Sheets-Sheet 2
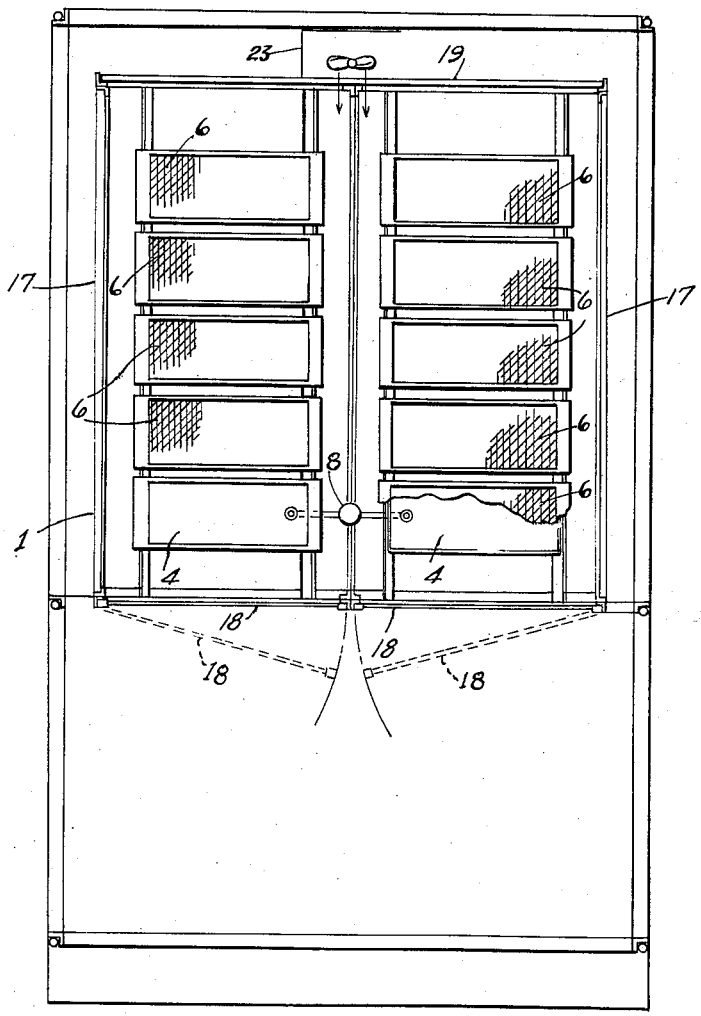
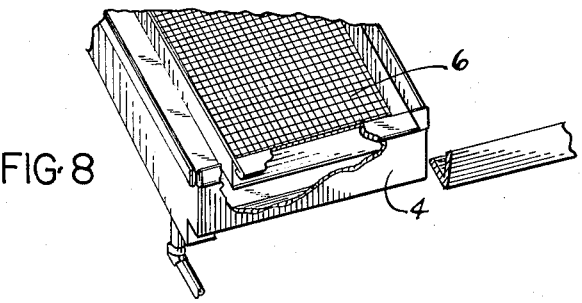
LOUIS A HOWSLEY, JR
ROGER L MALONE
*INVENTOR.*
BY
ATTORNEY United States Patent Office 2,897,631
Patented Aug. 4, 1959

2,897,631

APPARATUS FOR SOILLESS PLANT CULTIVATION

Louis Albert Howsley, Jr., and Roger Lewis Malone, Denton, Tex., assignors to First State Bank of Denton, Denton, Tex., trustee Application March 22, 1957, Serial No. 647,803

1 Claim. (Cl. 47—1.2)

The invention relates to the soilless or activated cultivation of plants, and it concerns more particularly an apparatus for germinating, sprouting, and growing plants for livestock feed or other purposes.

The use of the invention involves providing artificially controlled climatic conditions which are optimum for growing plants. For this purpose a completely insulated box is provided, to which light is admitted through translucent panels, and which is provided with means for controlling automatically the climatic conditions inside the box independently of conditions outside.

In the soilless or activated cultivation of plants, cabinets provided with suitable heating means, adapted to maintain within the cabinets a temperature favorable for the germination and growth of plants, have been used. Trays or baskets which contain the seed of the plants which are to germinate are arranged for best utilization of space within the cabinets.

It has been found that the growth of plants in a soilless culture medium is enhanced if the plants are maintained in a slightly pressurized atmospheric medium containing substantial amounts of carbon dioxide and other combustion gases through a system of ducts in which they are mixed with fresh air to produce gaseous mixtures having desired proportions of combustion gases, and introducing the gases into the cabinet through an opening which is of larger diameter than the exit opening whereby a superatmospheric pressure is maintained within the cabinet.

An object of the invention is to provide means for maintaining a uniform temperature within a cabinet of the type described consisting of separate heating and cooling means, operable by electricity or other forms of energy, which is adaptable to any atmospheric temperature. The need for such an arrangement has been demonstrated through tests which show that most plants which are commonly produced by soilless cultivation require optimum temperatures for germination and proper growth, which cannot be obtained by heat alone as the average atmospheric temperature is higher than the temperature tolerated by the plant to be germinated and grown.

Another object of the invention is to provide a cabinet which is completely insulated against heat and cold, and which advantageously may be formed in part by a plurality of wall panels each consisting of two sheets of glass which are spaced apart from each other to provide a dead air space between them.

Another object of the invention is to provide a cabinet which is constructed at least partly of glass, and which is capable of admitting adequate amounts of sunshine thereto, sufficient to produce healthy plants of good quality.

Another object of the invention is to provide a cabinet which is substantially air tight, and which does not include means for introducing therein either fresh air or combustion gases.

Another object of the invention is to provide a cabinet having coils for the circulation of a cooling fluid whereby temperatures may be maintained therein which are below the maximum temperatures at which the plants will grow and germinate properly, and having thermostatically controlled means whereby the temperature may be raised and lowered as necessary to maintain optimum temperatures for specific plants at all times, regardless of the atmospheric temperature.

A further object of the invention is to provide means for controlling the humidity of the atmosphere within the cabinet so as to maintain a humidity which is optimum for plant growth. In substantially every application of soilless cultivation, as practiced heretofore, the humidity within the cabinet usually is higher than is desirable, and contributes to the production of mold, bacterial activity, and other undesirable effects. The invention contemplates controlling the humidity as desired by adjustment of the cold producing coils.

A further object of the invention is to provide a cabinet which is so constructed as to preclude the interchange of air within and without the cabinet, and in which the humidity as well as the temperature may be variably controlled as necessary to fit conditions required by specific plants.

A further object of the invention is to provide a cabinet in which optimum conditions of temperature and humidity are maintained by means of a reversible fan located between hot and cold coils provided therein for the circulation of heating and cooling fluids, respectively, the fan being operable by a single switch, and automatically in response to the action of suitable relays, to maintain a predetermined, substantially optimum temperature in the cabinet, regardless of the atmospheric temperature.

A further object of the invention is to provide a method in which the carbon dioxide content of the atmosphere within the cabinet is increased by chemical means rather than by the use of combustion gases, as practiced heretofore. The invention contemplates the introduction of chemicals capable of releasing carbon dioxide into the water storage tanks located in the upper portion of the cabinet, such chemicals being introduced in measured amounts by suitable metering means. The invention further contemplates the circulation and distribution of carbon dioxide, as released by such chemicals, throughout the entire cabinet by means of the circulating fan, whereby growth of the plants is increased by the action of the carbon dioxide.

A still further object of the invention is to provide a method in which the development of mold, bacteria and the like is inhibited by the introduction of chemical bactericides, fungicides, and inhibitors into the irrigating solution in the storage tanks located in the upper portion of the cabinet, such chemicals being introduced in measured amounts by suitable metering means.

The invention will be readily understood by referring to the following description and the accompanying drawing, in which:

Figure 1 is an elevational view of apparatus embodying the invention;

Fig. 2 is a sectional elevational view taken on the line 2—2 of Fig. 1;

Figs. 3, 4, and 6 are fragmentary, sectional elevational views, on an enlarged scale, of portions of the apparatus;

Fig. 5 is a fragmentary, sectional plan view, on an enlarged scale, showing details of construction of the apparatus;

Fig. 7 is a sectional plan view taken on the line 7—7 of Fig. 2; and

Fig. 8 is a fragmentary perspective view, on an enlarged scale, of a portion of the apparatus.

Referring to the drawing, the numeral 1 designates generally a cabinet embodying the invention, which is constructed as hereinafter described.

As shown, the cabinet 1 has two identical sides, numbered 2 and 3, in each of which is arranged a plurality of trays 4, which are positioned one above the other, and each of which contains a soilless cultivating medium in which the seeds are placed to germinate. Above the topmost tray 4 is a tank 5 containing a supply of humidifying water. The trays 4 and the tank 5 are spaced one above the other at intervals sufficient to allow for the growth of plants. The tank 5 permits water used in the operation, as hereinafter described, to attain approximately the same temperature as that at which the plants are being maintained. The plant nutrients, which are to be distributed throughout the trays 4, as hereinafter described, are added to the water contained in the tank 5.

Each of the trays 4 contains a plurality of baskets 6. The baskets 6 have perforated bottoms, which are penetrated by the plant roots and which lend support to the plant as well as permit adequate contact of the roots with the nutrient solution. The baskets 6 are each suspended above the bottom of the tray 4 by means of tabs or ears which extend outwardly for engagement with the adjacent edges of the tray 4, to allow for adequate root growth.

The trays 4 are filled successively, by stages, beginning with the uppermost trays 4 and proceeding downwardly, with nutrient solution from the tank 5, as hereinafter described. As the nutrient solution is allowed to run into the uppermost trays 4, the solution rises in the baskets 6 through the perforated bottoms thereof, completely covering the contents of the baskets 6. When the water has reached the proper level in the trays 4 to completely cover a siphon 7 positioned in a water control box 8 located between the trays 4 at each level, the siphon 7 is actuated, causing the water to be siphoned into the water control box 8 immediately below it. Thus the water progresses downwardly by stages until it passes below the lowermost trays 4, where it enters a drain pipe 9 and is discharged from the cabinet 1. The used water may be used for irrigation or for watering stock, or may be recycled if desired.

For complete drainage of the water from each tray 4 after irrigation, which is desirable, a small opening 10 is provided in the bottom of each water control box 8, and a valve seat 11 is provided in the opening 10 for engagement by a ball 12 which is positioned below the opening 10 and suspended from the lower end of a chain 13 which is connected at its upper end, above the opening 10, to a float 14, the chain 13 being passed through the opening 10. As the water is introduced into the control box 8 the float 14 rises, pulling the chain 13 after it in such a manner as to seat the ball 12, which advantageously may be made of rubber. As the water level is lowered the float 14 drops, causing the ball 12 to fall below the seat 11, whereby any moisture which may be retained by the roots is gradually drained therefrom through the opening 10.

The water control box 8 opposite the lowermost trays 4 has a larger opening, corresponding to the openings 10 above described, which communicates with a pipe 15, the pipe 15 in turn being connected to the drain pipe 9. A float operable valve as above described is provided in the pipe 15 whereby water may be discharged therefrom through the drain pipe 9 rather than draining into the bottom of the cabinet 1.

The bent pipes inside the water control boxes 8 which comprise the siphons 7 are each connected to the bottom of the control box 8 by a packed joint which allows the pipe to be raised and lowered as necessary to make the siphon 7 adjustable to the desired height, which in turn controls the level of nutrient solution in the tray 4.

A pair of trays 16, each consisting of a drawer having a perforated bottom, in which the grain or seeds are placed to sprout after being sacked and allowed to drain, in the usual manner, are positioned below the lowermost trays 4.

The cabinet 1 is insulated throughout. As shown best in Fig. 5, two opposite side walls thereof, indicated by the numeral 17, and two doors 18 which together comprise the front wall thereof, are formed by glass panels each consisting of two sheets of glass which are spaced apart from each other to form a dead air space between them. The rear wall 19, the floor 20 and the ceiling 21 are formed of insulating board, and the roof 22 is formed of corrugated light reflecting metal such as aluminum.

A temperature and humidity control unit comprising means for controlling the temperature and humidity within the cabinet 1 as above described, which may be of any desired construction and which is indicated generally by the numeral 23, is connected to the rear wall 19.

The invention may be modified in various ways without departing from the spirit and scope thereof.

What is claimed is:

Apparatus for soilless plant cultivation comprising a cabinet defining a substantially air-tight chamber and having a plurality of culture trays arranged in tiers therein, and means for maintaining the temperature of the air within the chamber at an optimum temperature which may be lower than the prevailing atmospheric temperature while at the same time regulating the humidity thereof, the cabinet having a roof, a floor, and sides each insulated against heat and cold, the roof of the cabinet being formed of opaque material capable of reflecting light and the sides of the cabinet being formed at least in part by one or more panels each consisting of two sheets of glass spaced apart from each other to provide a dead air space between them, the panels being capable of admitting sunlight to the chamber while at the same time substantially insulating the chamber against heat and cold.

References Cited in the file of this patent

UNITED STATES PATENTS

| 1,121,722 | Fessenden | Dec. 22, 1914 |
| 1,620,776 | Monterubio | Mar. 15, 1927 |
| 1,726,767 | Richmond | Sept. 3, 1929 |
| 1,827,530 | Le Grand | Oct. 13, 1931 |
| 1,950,068 | Spangenberg | Mar. 6, 1934 |
| 1,950,701 | Spangenberg | Mar. 13, 1934 |
| 2,040,161 | Widmann | May 12, 1936 |
| 2,051,460 | Von Skrbensky | Aug. 18, 1936 |
| 2,051,461 | Lee | Aug. 18, 1936 |
| 2,121,461 | Widmann | June 21, 1938 |
| 2,223,316 | Ellis | Nov. 26, 1940 |
| 2,350,982 | Borst | June 13, 1944 |

FOREIGN PATENTS

| 439,421 | Great Britain | Dec. 2, 1935 |
| 744,200 | Great Britain | Feb. 1, 1956 |
| 59,686 | Netherlands | July 15, 1947 |